Patented Aug. 7, 1951

2,563,369

UNITED STATES PATENT OFFICE 2,563,369

REFINING FUEL OIL

Earle W. Reiley, Jr., Pasadena, and Lewis J. Duke, Houston, Tex., assignors to Shell Development Company, San Francisco, Calif., a corporation of Delaware No Drawing. Application January 4, 1949, Serial No. 69,236

8 Claims. (Cl. 196—40)

This invention relates to the refining of light petroleum fuel compositions and more particularly to petroleum fractions of the character of gas oils or fuel oils as are commonly utilized in domestic and commercial heating installations.

The improvement of screen clogging characteristics and other properties such as odor, storage stability, color stability, and the like, of fuel oils, has been the subject of much investigation and conjecture. Most of the efforts to solve these problems appear to have been directed along the lines of adding to fuel oils certain additives selected to accomplish the desired purpose, in large part by inhibiting normally occurring changes due to the presence of naturally occurring substances present in the oil.

The commonly used process for the refining of fuel or heating oils, which oils have boiling ranges within the broad range of from about 300° F. to about 750° F., preferably from about 400° F. to about 675° F., involves a treatment with sulfuric acid followed by neutralization of separated sour oil phase by use of aqueous alkali. But, as already indicated, fuel oils thus refined possess undesired characteristics.

It has now been found that an improved fuel oil can be prepared by a process comprising a proper combination of a controlled sulfuric acid treatment of fuel oil, separation of oil phase from acid phase, followed by a first clay treatment of separated oil phase, coordinated with the acid treatment, and the first clay treatment being coordinated with one or more subsequent clay treatments of the separated oil phase at selected temperatures and with simultaneous gaseous blowing in the presence of the clay. It is necessary that the individual operations be properly coordinated to achieve the desired results as pointed out hereinafter.

The amount of clay needed for removal of sludge material remaining dispersed and/or solubilized in the acid treated oil phase and for the subsequent clay treatments increases with amount of acid used in the acid treatment. Furthermore, the amount of clay utilized in the first clay treatment following the acid treatment is critical. Most of the color improvement and sludge acid removal takes place in the first stage. Therefore sufficient clay must be added to insure a low neutralization number of the oil leaving the separator following the first clay treatment. But nothing more is to be gained by utilizing a large excess of clay in this first clay treatment since it does not reduce the clay requirements of the subsequent treatment(s), and economically it is undesirable.

The proportion of acid utilized in the acid treatment ranges, in general, from about one pound to about four pounds of about 87–95% sulfuric acid per barrel of the fuel oil. However, depending on the exact nature of the oil, there is an optimum ratio of acid to oil for a given set of contacting conditions. Thus, it has been found that for treatments at normal ambient atmospheric conditions the following ratios are optimum for three different refinery fuel oil (gas oil) stocks: 1½ to 2 pounds $H_2SO_4$ per barrel of thermally cracked stock; 3 to 3½ pounds per barrel of catalytically cracked stock; and 1 pound per barrel of heavy sour straight run gas oil.

The first clay treatment should be effected at ambient atmospheric temperatures. However, it is advantageous to effect the subsequent clay treatment(s), preferably two, at an elevated temperature, and such elevated temperature is necessary in the case of some gas oil stocks in order to obtain a product of sufficiently low color value and stability. The temperature may be as high as about 180° F., and preferably should be up to 160° F., in the subsequent clay treating stages if the oil has been treated with the optimum amount of acid, as already indicated, and the required amount of clay therefor as already indicated. But, when an excess of acid is utilized temperatures even as low as 130° F. have been found to be harmful unless very large quantities of clay were added.

The clay treatments are advantageously carried out by a combination of consecutive mixing and separating (in settlers) steps, the final oil-clay separation (settling and decantation) being followed by a dry filtering operation of separated oil phase. In a preferred embodiment a charge of the acid-treated oil is mechanically agitated for about 15 to 30 minutes with the first clay charge, the mixture passed to a settler from which settled clay is withdrawn and sent to waste or a recovery system while decanted oil is passed to a second stage mixer. The oil is then mechanically agitated with a second clay charge while simultaneously blowing with an inert gas ($N_2$, $CO_2$, etc.), alone or mixed with oxygen, air being a preferred gaseous mixture, for about 15 to 30 minutes at 120–135° F. The blowing serves to effect coagulation of colloidal particles which are removed by the absorbent clay while at the same time to remove excess $SO_2$. The oil is then separated from the clay in a second settler, the separated clay being charged to the first treating operation while the oil (if desired) is charged to a third mixer wherein another clay-air treatment is carried out similar to clay treating step two, except at a higher temperature. Recovered clay from this third step may be used in step two. The thus treated oil is then filtered to remove any remaining suspended clay particles.

Any of the various adsorptive clays, preferably aluminate silicate clays, well known in the art and utilized before in refining light hydrocarbon fractions, may be utilized.

A summary of optimum treating conditions for the three different refinery stocks already referred to is presented in Table I.

higher acidity. The use of more acid in the acid treatment appears to remove these organic acids and give a lower neutralization number, but over acid treatment increases the potential corrosivity of the finished product. In this connection, it has been found that aqueous caustic more completely removes sulfur dioxide from the oil than does clay neutralization, but that the air blowing in the presence of the clay effectively removes the sulfur dioxide. Therefore, the higher acidity of the clay-air treated product than the aqueous caustic treated product is not attributable to a difference in the removal of sulfur dioxide.

Another advantage in practicing the present

TABLE I

*Refining conditions for fuel oil*

| Stock | $H_2SO_4$ lbs./bbl. | Temperature, °F. | | | Clay, lbs./bbl. | | |
|---|---|---|---|---|---|---|---|
| | | Stage 1 | Stage 2 | Stage 3 | Stage 1 | Stage 2 | Stage 3 |
| Catalytically Cracked Gas Oil (C. C.) | 3.0 | 95–110 | 135 | 155 | 1 | 1 | 2 |
| Thermally Cracked Gas Oil (T. C.) | 1.5 | 95–110 | 125 | 140 | 1 | 1 | 2 |
| Heavy Sour Straight Run Gas Oil (H. S. SR) | 1.0 | 95–110 | 125 | 140 | ½ | ½ | 1 |

The improvement of the products obtained in accordance with the refining operations indicated in Table I, in accordance with the present invention, over corresponding products obtained by applying similar acid treatments to similar gas oil stocks followed by the normally employed aqueous caustic alkali neutralization and water washing instead of the clay and air treating combination of this invention, is shown by the comparative data given in Table II.

invention over the aqueous caustic treatment is the avoidance of introducing water into the oil, which is considered to contribute, at least in part, to the tendency of the usual fuel oils to result in the clogging of screens in burner installation fuel oil lines.

The efficacy of the present invention in minimizing screen clogging and sludge formation and the superiority in these characteristics of the fuel oils produced by its application over similar com-

TABLE II

| Gas Oil Stock [2] | London Heat Test [1] | | | | Neut. No. | Potential Corrosivity, P. P. M.[3] | CCR[4] 10% Botts |
|---|---|---|---|---|---|---|---|
| | 0 Hrs. | 16 Hrs. | 24 Hrs. | 48 Hrs. | | | |
| T. C.[5] | 2 | 2 | 2+ | 2½ | 0.02 | 15 | 0.23 |
| T. C.[6] | 3 cldy | 5 | 5 | 7 | 0.01 | 20 | 0.29 |
| H. S.[5] | 1+ | 1½ | 1½ | 1½ | 0.15 | 25 | 0.05 |
| H. S.[6] | 2 cldy | 3½ | 3½ | 4 | 0.02 | 250 | 0.07 |
| C. C.[5] | 1 | 2 | 2 | 2 | 0.03 | 5 | 0.25 |
| C. C.[6] | 2 cldy | 3½ | 4 | 4½ | Nil | 30 | 0.30 |

[1] Color and appearance comparisons after heating the material in a glass bottle at 212° F. for the indicated period of time, while venting to atm.
[2] The designations T. C., H. S. and C. C. are the same as those used in Table I.
[3] Quantity of copper reacted when 80 ml. of oil is contacted with 157 cm. of 14 gauge electrolytic copper wire for 16 hrs. at 194° F.
[4] Indicates Conradson Carbon Residue of a 10% bottoms fraction.
[5] Indicates treatment according to the present invention.
[6] Indicates treatment with acid and aqueous caustic as described above.

It will be noted that the neutralization numbers of the clay treated product are higher in each case than those of the aqueous caustic treated product, which product of course was thoroughly water washed to remove any excess alkali. It is not known if this represents organic acids present in the acid-treated product which are not removed by the clay treatment or if it represents organic acids formed in the oil as a result of the air blowing of the neutralized oil in the presence of the clay in the subsequent clay treatments and which acids are not simultaneously adsorbed and removed by the clay. However, there is evidence which indicates that the first possibility accounts, at least in part, for the mercial products prepared in a similar way except for substitution of the usual aqueous caustic neutralization and treatment for the combination clay and air treatments of the invention have been shown by experimental results. Thus, samples of the different oils were passed through a standard screen of the type used commercially and under a given pressure. The time required for the flow of a selected volume of the oil through the screen, and of any changes in rate of flow as the test progressed, were determined, in one test (A), the results being a measure of the suitability or unsuitability of the oil, while in another test (B), the appearance of the screen (amount of covering deposit of sludge and the like) was determined after circulating the oil through a pipe system containing the screen for an extended given period of time (24 hours). The results are tabulated in Table III.

TABLE III

| Fuel Oil | Sample Aged at 150° F. | Screen Clogging Test | |
|---|---|---|---|
| | | Test A | Test B |
| | *Hours* | | |
| Blend I [1] | 24 | Negligible or no change in rate of flow. | |
| Do.[1] | 48 | ......do...... | |
| Do.[1] | 72 | ......do...... | |
| Do.[1] | | | Pass (clean screen). |
| Do.[2] | 24 | Fail................ | |
| Do.[2] | | Substantial reduction in rate of flow. | |
| Do.[2] | | | Fail (screen coated with sludge). |

[1] Blend of acid-clay-air treated products of Table II: 50% catalytically cracked, 30% heavy sour S. R., 20% thermally cracked.
[2] Similar blend but of products of acid-aqueous caustic treated gas oil fractions.

Thus, the present invention provides a process involving a coordinated combination of operations by the use of which an improved fuel oil product is obtained.

We claim as our invention:

1. A process for refining petroleum fuel oil distillate stocks of the character of catalytically cracked gas oil, thermally cracked gas oil and heavy sour straight run gas oil consisting of the steps: (1) acid treating a charge of a fuel oil distillate stock with sulfuric acid of 87–95% strength in the proportions of from one to four pounds of $H_2SO_4$ per barrel of the oil charge and recovering an acid-treated sour oil phase from the resulting treating mixture; (2) intimately contacting by mechanical agitation in the absence of air treatment the acid-treated sour oil at a temperature of about 95–110° F. with an adsorbent and acid-removing clay in amount only sufficient to substantially remove the acidic bodies in the oil and separating the clay-treated oil from the clay; and (3) intimately contacting the clay-treated oil at a temperature of from about 120° F. to about 160° F. with a further treating quantity of adsorbent clay while simultaneously intimately contacting the oil-clay mixture with air, and recovering the thus treated oil from the clay.

2. A process for refining petroleum fuel oil distillate stocks of the character of catalytically cracked gas oil, thermally cracked gas oil and heavy sour straight run gas oil comprising treating a charge of the fuel oil stock with from one to four pounds of concentrated sulfuric acid of 87–95% strength per barrel of the oil charge, separating the resulting acid and sour oil phases, intimately contacting by mechanical agitation in the absence of air treatment the separated sour oil at ambient atmospheric temperature with an acid-removing clay in amount only sufficient to substantially remove the acidic bodies in the oil, separating the thus treated oil from the clay, intimately contacting the separated clay-treated oil at a temperature of from about 120° F. to about 135° F. with an adsorbent clay while simultaneously intimately contacting the mixture with air, separating the oil from the clay, intimately contacting the separated oil at a temperature of from about 140° F. to about 160° F. with an adsorbent clay while simultaneously intimately contacting the mixture with air, and separating the resulting refined fuel oil from the clay.

3. A process for refining petroleum fuel oil distillate stocks of the character of catalytically cracked gas oil, thermally cracked gas oil and heavy sour straight run gas oil comprising treating a charge of the fuel oil stock with sulfuric acid of 87–95% strength, separating resulting oil and acid phases, intimately contacting by mechanical agitation in the absence of air treatment the separated acid treated sour oil phase at ambient atmospheric temperature with an adsorbent and acid-removing clay in amount sufficient to substantially remove the acidic bodies in the oil, separating the thus treated oil from the clay, intimately contacting the separated clay-treated oil at a temperature of from about 120° F. to about 160° F. with a further treating quantity of adsorbent clay and simultaneously intimately contacting the oil and clay mixture with an oxygen containing gas, and separating the thus treated oil from the clay.

4. A process for refining petroleum fuel oil distillate stocks of the character of catalytically cracked gas oil, thermally cracked gas oil and heavy sour straight run gas oil comprising treating a charge of the fuel oil stock with sulfuric acid of 87–95% strength, separating resulting oil and acid phases, intimately contacting by mechanical agitation in the absence of air treatment the separated acid treated sour oil phase at ambient atmospheric temperature with an adsorbent and acid-removing clay in amount sufficient to substantially remove the acidic bodies in the oil, separating the thus treated oil from the clay, intimately contacting the separated clay-treated oil at a temperature of from about 120° F. to about 160° F. with a further treating quanity of adsorbent clay and simultaneously blowing the oil and clay mixture with a gas, and separating the thus treated oil from the clay.

5. A process for refining non-catalytically-cracked petroleum gas oil distillate stocks consisting of the steps: (1) acid treating a charge of said stock with from about 1 to about 1.5 pounds of concentrated sulfuric acid of 87–95% strength per barrel of oil charge and separating the resulting acid and sour oil phases; (2) intimately contacting by mechanical agitation in the absence of air treatment the acid-treated sour oil at a temperature of about 95–110° F. with an adsorbent and acid-removing clay in amount only sufficient to substantially remove the acidic bodies in the oil and being about 1 to 1½ pounds of clay per barrel of oil and separating the clay-treated oil from the clay; (3) intimately contacting the separated clay-treated oil at a temperature of about 125° F. with about 1 to 1½ pounds of clay per barrel of oil while simultaneously intimately contacting the mixture with air and separating the second-clay-treated oil from the clay; and (4) intimately contacting the last-separated oil at a temperature of about 140° F. with about 1–2 pounds of clay per barrel of oil while simultaneously intimately contacting the mixture with air and separating the resulting refined fuel oil from the clay.

6. The process in accordance with claim 5, wherein the petroleum gas oil distillate stock is a thermally cracked gas oil.

7. The process in accordance with claim 5, wherein the petroleum gas oil distillate stock is a heavy sour straight run gas oil.

8. A process for refining catalytically cracked petroleum gas oil stocks consisting of the steps: (1) acid treating a charge of said gas oil with about 3 pounds of concentrated sulfuric acid of 87-95% strength per barrel of oil charge and separating the resulting acid and sour oil phases; (2) intimately contacting by mechanical agitation in the absence of air treatment the acid-treated sour oil at a temperature of about 95-110° F. with an adsorbent and acid-removing clay in amount only sufficient to substantially remove the acidic bodies in the oil and being about 1 pound of clay per barrel of oil and separating the clay-treated oil from the clay; (3) intimately contacting the separated clay-treated oil at a temperature of about 135° F. with about 1 pound of clay per barrel of oil while simultaneously intimately contacting the mixture with air and separating the second-clay-treated oil from the clay; and (4) intimately contacting the last-separated oil at a temperature of about 155° F. with about 2 pounds of clay per barrel of oil while simultaneously intimately contacting the mixture with air and separating the resulting refined fuel oil from the clay.

EARLE W. REILEY, JR.
LEWIS J. DUKE.

REFERENCES CITED

The following references are of record in the file of this patent:

UNITED STATES PATENTS

| Number | Name | Date |
|---|---|---|
| 1,690,772 | Delbridge et al. | Nov. 6, 1928 |
| 1,847,623 | Ott | Mar. 1, 1932 |
| 2,035,349 | Smith | Mar. 24, 1936 |
| 2,321,290 | Giraitis | June 8, 1943 |